US012786185B2

(12) United States Patent
Albero et al.

(10) Patent No.: US 12,786,185 B2
(45) Date of Patent: Nov. 3, 2026

(54) SYSTEM AND METHOD FOR AUTHENTICATING AN AVATAR ASSOCIATED WITH A USER WITHIN A METAVERSE USING BIOMETRIC INDICATORS

(71) Applicant: Bank of America Corporation, Charlotte, NC (US)

(72) Inventors: George Anthony Albero, Charlotte, NC (US); Maharaj Mukherjee, Poughkeepsie, NY (US); Prashant Thakur, Grandhinagar (IN)

(73) Assignee: Bank of America Corporation, Charlotte, NC (US)

( * ) Notice: Subject to any disclaimer, the term of this patent is extended or adjusted under 35 U.S.C. 154(b) by 854 days.

(21) Appl. No.: 18/054,754

(22) Filed: Nov. 11, 2022

(65) Prior Publication Data

US 2024/0163284 A1 May 16, 2024

(51) Int. Cl.
*H04L 9/40* (2022.01)

(52) U.S. Cl.
CPC ................................ *H04L 63/0861* (2013.01)

(58) Field of Classification Search
CPC ................................................... H04L 63/0861
See application file for complete search history.

(56) References Cited

U.S. PATENT DOCUMENTS 8,194,646 B2 6/2012 Elliott et al.
8,369,579 B2 2/2013 Frigerio
8,813,125 B2 8/2014 Reisman
9,389,890 B2 7/2016 Hamby et al.
9,443,383 B2 9/2016 Fine et al.
10,699,283 B2 6/2020 Marovets
10,771,486 B2 9/2020 Murphey et al.
11,140,417 B2 10/2021 Hannuksela
11,323,723 B2 5/2022 Hannuksela et al.
2014/0143295 A1 5/2014 Girsch et al.
2014/0282868 A1* 9/2014 Sheller .................. G06F 21/316 726/3
2014/0372303 A1* 12/2014 Gafni .................... G06Q 20/02 705/44
2017/0337769 A1 11/2017 Hill
2017/0364920 A1 12/2017 Anand
2019/0273737 A1 9/2019 Cai et al.
2020/0045323 A1 2/2020 Hannuksela
2021/0149662 A1 5/2021 Lereya et al.
(Continued)

*Primary Examiner* — Jeffrey D. Popham

(57) ABSTRACT

A system for extracting a plurality of biometric indicators from a user profile stored in a memory of a server, wherein the plurality of biometric indicators is derived from the user using facial recognition and fingerprint analysis. The system embeds the extracted plurality of biometric indicators into an avatar associated with the user. Upon receiving a request from the avatar to access a virtual reality (VR) environment, the system determines one or more biometric indicators from the plurality of biometric indicators embedded into the avatar. The system determines a match by comparing the determined one or more biometric indicators with the corresponding biometric indicators from the user profile stored in the memory. In response to determining the match, the system authenticates the avatar and approves the request to allow the avatar to access the virtual environment.

20 Claims, 4 Drawing Sheets

(56) References Cited

U.S. PATENT DOCUMENTS

| | | | | |
|---|---|---|---|---|
| 2021/0314408 | A1* | 10/2021 | Hodge | G06F 21/32 |
| 2021/0398357 | A1 | 12/2021 | Samec et al. | |
| 2022/0157003 | A1 | 5/2022 | Wedig et al. | |
| 2022/0207809 | A1 | 6/2022 | Comer | |
| 2022/0230374 | A1 | 7/2022 | Paradiso et al. | |
| 2025/0392596 | A1* | 12/2025 | Thomas | H04L 63/101 |

* cited by examiner

SYSTEM AND METHOD FOR AUTHENTICATING AN AVATAR ASSOCIATED WITH A USER WITHIN A METAVERSE USING BIOMETRIC INDICATORS

TECHNICAL FIELD

The present disclosure relates generally to network communications and information security, and more specifically to a system and method for authenticating an avatar associated with a user within a metaverse using biometric indicators.

BACKGROUND

An entity may provide different services at different physical locations through different systems in a network. Users may use different physical devices to interact with the entity to obtain authorized access to services through different systems in a real-world environment and a virtual environment in the network. Existing systems generally require users to submit credentials each time to access the different physical locations and services in the network. User reauthentication in this context consumes valuable computer, memory, and network resources to transmit, store and verify the credentials.

SUMMARY

Conventional technology is not configured to allow an avatar associated with a user to navigate through virtual operation areas and perform interactions with entities at different physical locations associated with virtual locations in a virtual environment (e.g., such as a metaverse). The system described in the present disclosure is particularly integrated into a practical application of authenticating an avatar associated with a user within a metaverse with an entity in a real-world environment to allow the user device to navigate through virtual operation areas in a virtual environment.

The disclosed system is configured to extract a plurality of biometric indicators derived from a user, such as by using facial recognition and fingerprint analysis. The plurality of biometric indicators is stored in a user profile in a memory of a server. The plurality biometric indicators includes a token, facial features, and/or fingerprints. The disclosed system is configured to embed the extracted plurality of biometric indicators into an avatar associated with the user and user device. The disclosed system provides a virtual environment that may include a plurality of virtual operation areas that are associated with the corresponding physical locations in the real-world environment. The disclosed system is configured to receive a request from the avatar to access a virtual reality (VR) environment, and to determine one or more biometric indicators from the plurality of biometric indicators embedded into the avatar in response to receiving the request for access. The disclosed system is configured to compare the determined one or more biometric indicators with corresponding biometric indicators from the user profile stored in the memory to authenticate the avatar and, in conjunction, the user device. In response to this authentication of the avatar, the disclosed system allows the avatar associated with the user device to access the corresponding virtual operational areas in the virtual environment.

In one embodiment, the system for authenticating an avatar associated with a user that navigate through a plurality of virtual operation areas in a virtual environment comprises a processor and a memory. The memory is operable to store a user profile comprising a plurality of biometric indicators derived, for example, from a user using facial recognition and/or fingerprint analysis. The plurality of biometric indicators is configured to authorize an avatar associated with a user to perform an interaction with at least one entity associated with a plurality of physical locations in a real-world environment. The processor receives a request from the avatar to access a VR environment and determines one or more biometric indicators from the plurality of biometric indicators embedded into the avatar in response to receiving the request for access. The VR environment includes a plurality of virtual operation areas configured to provide a corresponding interaction associated with an entity associated with one or more physical locations in the real-world environment. The processor compares the determined one or more biometric indicators with the corresponding biometric indicators from the user profile stored in the memory. The processor determines a match between the determined one or more biometric indicators and the corresponding biometric indicators from the user profile stored in the memory. In response to determining the match, the processor authenticates the avatar and approves the request to allow the avatar to access the virtual environment.

The present disclosure provides several practical applications related to network security, data security, and user and avatar authentication. One such practical application may be implemented by a processor to allow an avatar associated with a user device to perform interactions without the need to reauthenticate the user device in different virtual operation areas a virtual environment. For example, the system authenticates a user device (e.g., augmented reality (AR)/virtual reality (VR) headset, mobile device, etc.) with an entity in a real-world environment to facilitate a more efficient navigation and operation of that user device in a corresponding virtual environment. The user device may be authenticated for a particular user and a particular entity in the real world by checking credentials used by the user device for accessing the entity. The system provides enhanced authentication measures, however, through the use of biometric indicators that are derived from the user and embedded into the user's avatar used in the virtual environment. For example, the system generates a plurality of biometric indicators derived from the user using, for example, facial recognition and/or fingerprint analysis. One or more biometric indicators from the plurality of biometric indicators are then embedded into the avatar associated with a user. Accordingly, the avatar embedded with biometric indicators may be distinguished from other similar looking avatars that are not embedded with the biometric indicators of the user. When the avatar embedded with the biometric indicators of the user seeks to gain access to particular areas within the virtual environment, one or more biometrics from that avatar may be extracted and compared against biometric markers that are stored in a user profile for the user. If a threshold number of biometric indicators extracted from the avatar match corresponding biometric indicators stored in the user profile, then the avatar is authenticated. Once authenticated, the avatar may be permitted (1) to access to one or more virtual areas within the virtual environment; (2) to perform one or more transactions within the virtual environment; and/or (3) to conduct other actions that require authentication for security purposes.

These practical applications lead to the technical advantage of improving information and network security to the overall computer system since it allows an avatar associated with a registered avatar associated with a user to seamlessly navigate through virtual operation areas and/or perform operations in the virtual environment. Since user authentication generally requires a user to submit credentials each time from one operation area to another operation area of the virtual environment, it consumes network bandwidth when transmitting the credentials. It also consumes additional memory space when storing the credentials in cache. Further, additional processor cycles are required to verify the credentials. Accordingly, the disclosed system conserves computer processing, memory utilization, and network resources. The disclosed system further improves user experiences and saves task processing time of the computer systems. Thus, the disclosed system improves computer system processing efficiency and the operations of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

This disclosure presents a system to authenticate an avatar associated with a user in a virtual environment by referring to FIGS. 1 through 4A-4B.

Figure 1:
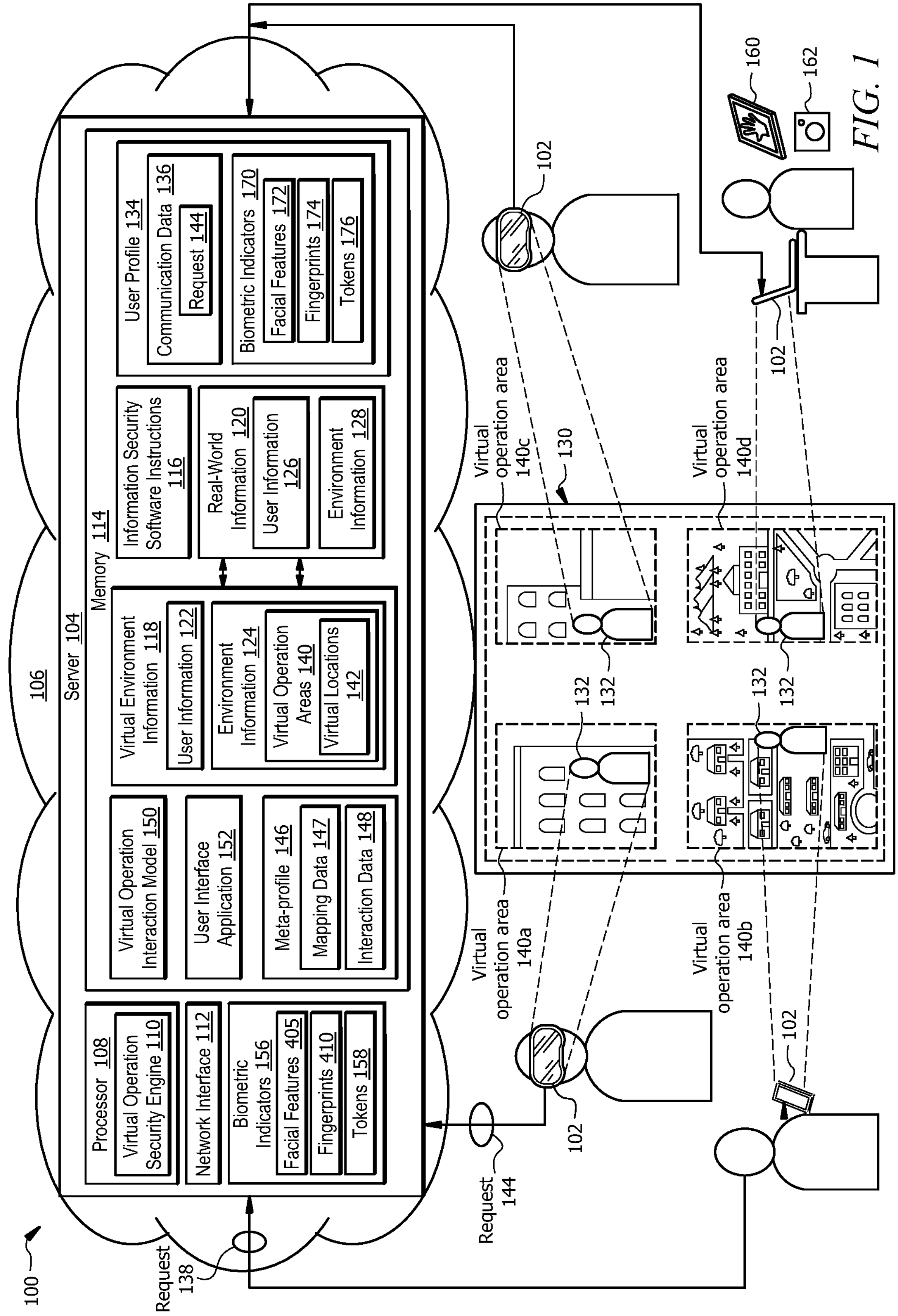
FIG. 1 illustrates an embodiment of a system configured to authenticate an avatar associated with a user device in a virtual environment.

Example System for Authenticating an Avatar Associated with a User within a Metaverse Using Biometric Indicators to Access a Virtual Environment FIG. 1 illustrates one embodiment of a system 100 that is configured to authenticate an avatar 132 associated with a user within a metaverse using biometric indicators when to access to a plurality of dynamic virtual operation areas 140 (e.g., 140*a*-140*d*) to perform interactions within a virtual environment 130. In one embodiment, system 100 comprises a server 104, one or more user devices 102, and a network 106. The system 100 may be communicatively coupled to the network 106 and may be operable to transmit data between each user device 102 and the server 104 through the network 106. Network 106 enables the communication between components of the system 100. Server 104 comprises a processor 108 in signal communication with a memory 114. Memory 114 stores information security software instructions 116 that when executed by the processor 108, cause the processor 108 to execute one or more functions described herein.

In some embodiments, the system 100 may be implemented by the server 104 to extract a plurality of biometric indicators 170 using facial recognition and fingerprint analysis to register an avatar 132 associated with the user with an organization entity for accessing a plurality of physical locations in the real-world environment. The system 100 stores the plurality of biometric indicators 170 in a user profile 134 stored in the memory 114 of the server 104. The system 100 embeds the extracted plurality of biometric indicators 170 into an avatar 132 associated with the user.

The biometric indicators 170 can include facial features 172, fingerprints 174, and tokens 176 associated with the user. For example, the system 100 can use a facial recognition algorithm to identify or verify the user using one or more facial features 172 associated with the user from an image captured through a face scanner 162 that includes a representation of a human face of the user. In particular, the one or more facial features 172 include characteristics such as iris color, dimensions and contours of a facial element (e.g., eyes, nose, mouth, and head), hair color, eye color, distances between facial elements (e.g., pupil-to-pupil, mouth width, etc.), and pixilation corresponding to skin tone or texture. As another example, the system 100 can perform anti-spoofing using facial gestures in the eye(s) area (e.g., blinks, winks), the mouth area (e.g., smiling, frowning, displaying teeth, extending a tongue), the noise/forehead area (e.g., wringle), etc. The system 100 can convert the determined one or more facial features 172 of the user into a mathematical representation and compare to data on other faces collected in a face recognition database.

Furthermore, the system 100 can use a fingerprint detection apparatus 160 to determine one or more fingerprints 174 associated with the user. For example, the one or more fingerprints 172 can include one or more fingerprint impressions derived from a fingerprint image by rotating the user's thumb or one of other lingers from one side of the nail to the other to scan the entire pattern area. As another example, the one or more fingerprints 172 can include finger features of a finger (or fingers) of a hand of the user, such as dimensions and shape of a finger(s) element, vein pattern, nail color, skin texture, skin tone, impedance, conductance, capacitance, inductance, infrared properties, ultrasound properties, thermal properties, etc. Furthermore, the system 100 may be implemented by the server 104 to generate tokens 176 to register the avatar 132 associated with the user with the organization entity for accessing a plurality of physical locations in the real-world environment. The server 104 may store of the plurality of biometric indicators 170 associated with the user in the user profile 134 in the memory 114. The system 100 may create a meta-profile 146 associated with the user profile 134 and include the plurality of biometric indicators 170. The system 100 may obtain the plurality of biometric indicators 170 from prior experience or the first time when the user accesses the virtual environment 130.

Furthermore, the system 100 may receive a request 144 from the avatar 132 to access a virtual environment 130. The system 100 determines one or more biometric indicators 156 from the plurality of biometric indicators embedded into the avatar 132 in response to receiving the request 144 for access. The determined one or more biometric indicators 156 may be compared with the corresponding biometric indicators 170 from the user profile 134 stored in the memory 114 to grant access to the user to a plurality of virtual operation areas 140 associated with the physical locations of the entity. The system 100 may authenticate the avatar 132 and allows the avatar 132 to access the corresponding virtual operation areas 140 when the determined one or more biometric indicators 156 matches the corresponding biometric indicators 170 from the user profile 134 stored in the memory 114. The avatar 132 associated with the user may seamlessly navigate through the virtual operation areas 140 to complete an interaction session within a virtual environment 130.

Furthermore, the system 100 may perform periodic and event triggered authentication of the avatar 132 associated with the user. For example, the authentication of the avatar 132 occurs in conjunction with predetermined time periods and/or upon screen refresh. As another example, the authentication of the avatar is triggered by the avatar entering a new operation area within the VR environment and/or by the avatar attempting to perform a transaction. The system 100 determines one or more biometric indicators 156 from the plurality of biometric indicators embedded into the avatar 132 in response to performing periodic and/or event triggered authentication of the avatar 132 associated with the user. The determined one or more biometric indicators 156 may be compared with the corresponding biometric indicators 170 from the user profile 134 stored in the memory 114 to grant access to the user to a plurality of virtual operation areas 140 associated with the physical locations of the entity. The system 100 may allow the avatar 132 to access the VR environment 130 when the determined one or more biometric indicators 156 match the corresponding biometric indicators 170 from the user profile 134 stored in the memory 114.

Furthermore, the system 100 may receive a second request 138 from the avatar 132 to access a virtual environment 130. The system 100 determines additional biometric indicators 156 from the plurality of biometric indicators embedded into the avatar 132 in response to receiving the request 138 for access. The determined additional biometric indicators 156 may be compared with the corresponding additional biometric indicators 170 from the user profile 134 stored in the memory 114 to reject access to the user to a plurality of virtual operation areas 140 associated with the physical locations of the entity. The system 100 may reject the second request 138 to allow the avatar 132 to access the VR environment 130 when the determined additional biometric indicators 156 do not match the corresponding additional biometric indicators 170 from the user profile 134 stored in the memory 114.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Each user device 102 is further configured to allow the avatar 132 associated with the user to send an interaction request or request 144 for the avatar 132 associated with the user to access and navigate through virtual operation areas 140 in the virtual environment 130 to interact with the server 104. As another example, a user may use the avatar 132 associated with the user to send an interaction request 144 that requests a transfer of real-world resources and/or virtual resources between the avatar 132 associated with the user and the server 104. Example processes are described in more detail below.

Each user device 102 is configured to display a two-dimensional (2D) or three-dimensional (3D) representation of a virtual environment 130 to a user. Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. Within the virtual environment 130, each user may be associated with a user device 102 and an avatar 132. An avatar 132 is a graphical representation of the user device 102 and the user within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with an entity associated with the server 104 or other avatars 132 and objects within the virtual environment 130.

Figure 2:
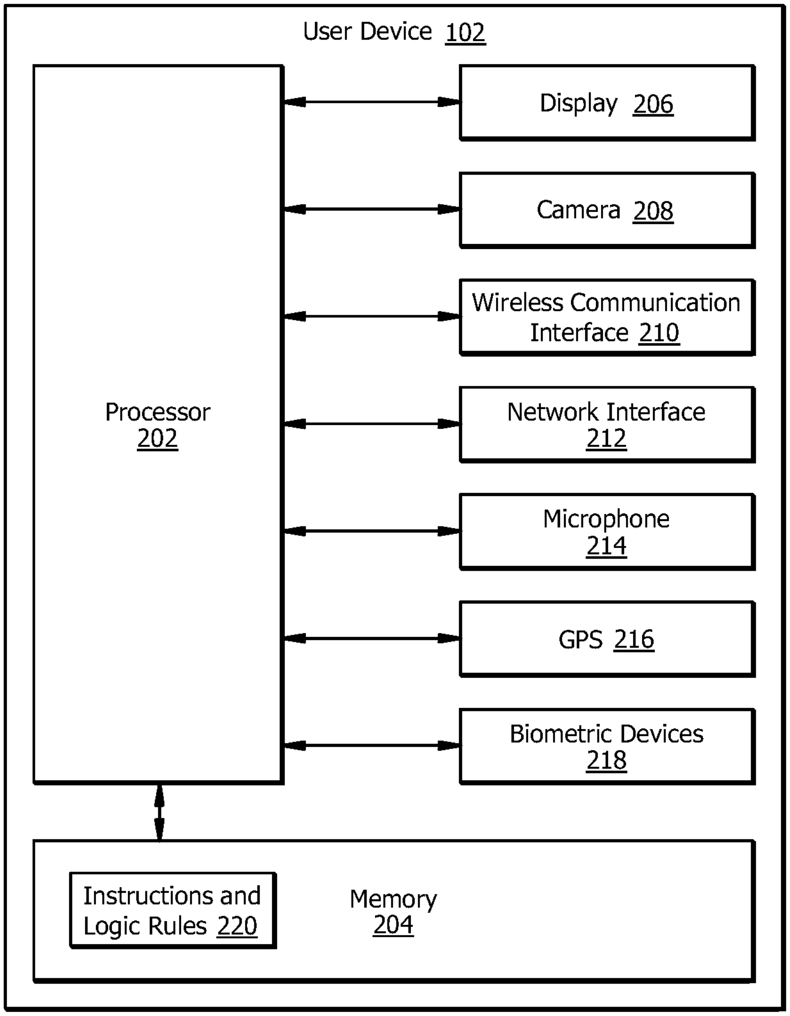
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

Figure 3:
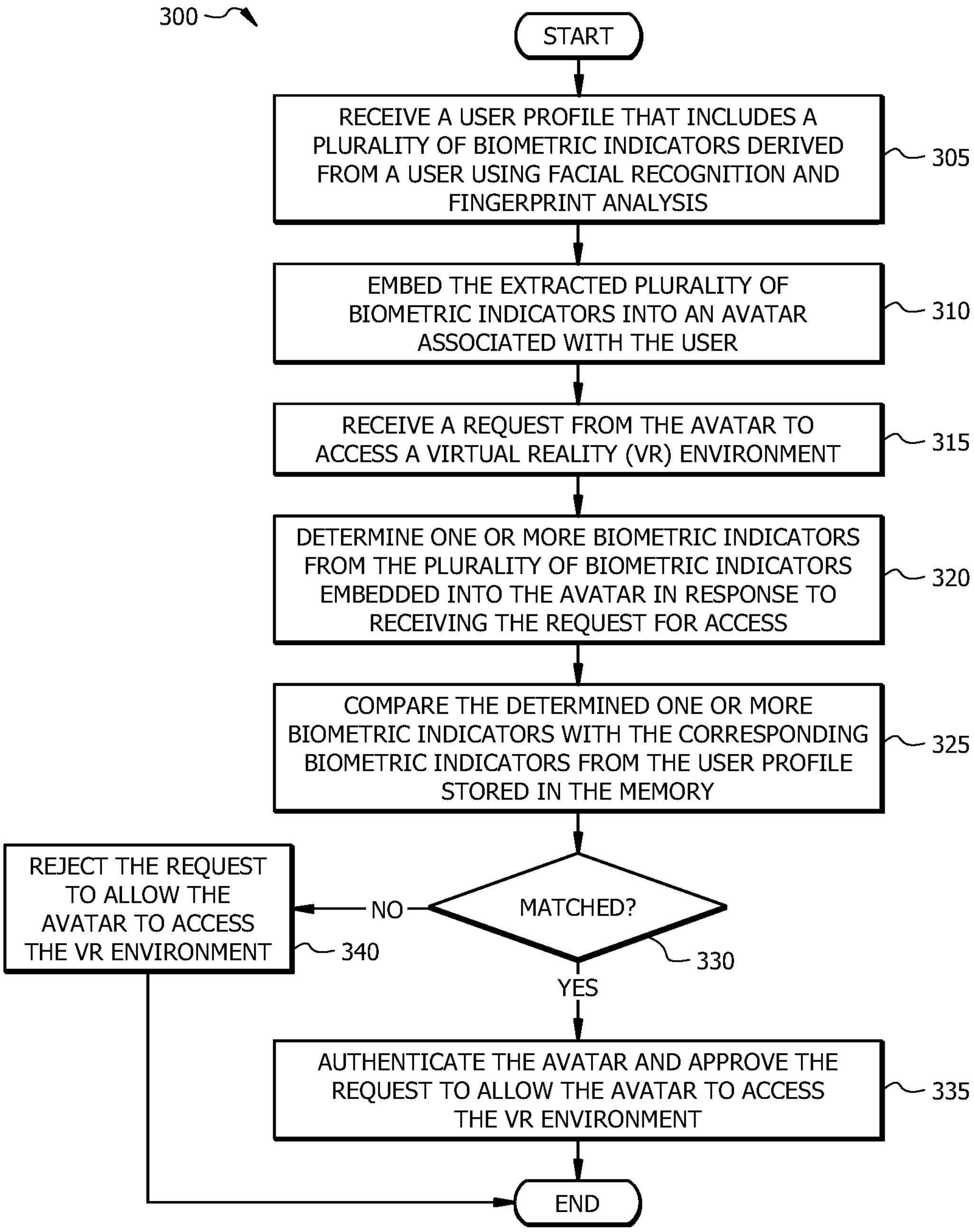
FIG. 3 illustrates an example operational flow of a method for authenticating an avatar associated with a user in the virtual environment.

The memory 204 is operable to store any of the information described with respect to FIGS. 1 and 3 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution.

Display 206 is configured to present visual information to a user (for example, user in FIG. 1) in an augmented reality, virtual reality, and/or metaverse environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. Camera 208 is a hardware device that is configured to capture images continuously, at predetermined intervals, or on-demand. For example, camera 208 may be configured to receive a command from the user to capture images of a user within a real environment. In another example, camera 208 is configured to continuously capture images of a field of view in front of the user device 102 and/or in front of the camera 208 to form a video stream of images. Camera 208 is communicably coupled to processor 202 and transmit the captured images and/or video stream to the server 104.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. Wireless communication interface 210 is configured to employ any suitable communication protocol.

The network interface 212 is configured to enable wired and/or wireless communications. The network interface 212 is configured to communicate data between the user device 102 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, facial scanners, retina scanners and fingerprint scanners. Biometric devices 218 are configured to capture information about a person's physical characteristics and to output a biometric signal based on captured information. Biometric device 218 is communicably coupled to processor 202.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of the virtual operation security engine 110, as described further below in conjunction with the operational flows of the method 300 described in FIG. 3. In particular embodiments, the server 104 may be implemented in the cloud or may be organized in either a centralized or distributed manner.

Processor

The processor 108 is a hardware device that comprises one or more processors operably coupled to the memory

114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. The processor 108 may be a special-purpose computer designed to implement the functions disclosed herein.

In an embodiment, the virtual operation security engine 110 is implemented using logic units, FPGAs, ASICs, DSPs, or any other suitable hardware. The virtual operation security engine 110 is configured to operate as described in FIG. 3. The virtual operation security engine 110 may be configured to perform the operations of the method 300 as described in FIG. 3. For example, the virtual operation security engine 110 may be configured to provide multifactor authentication within a real-world environment and a virtual environment 130 for a user to access and interact with an entity in the virtual environment 130. As another example, the virtual operation security engine 110 may be configured to facilitate real-world resource and/or virtual resource transfers between users within a virtual environment 130.

The memory 114 stores any of the information described above with respect to FIGS. 1-2 and 3 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, user profiles 134, meta-profile 146, virtual environment information 118, real-world information 120, avatars 132, virtual operation areas 140 including corresponding virtual locations 142, virtual environment 130, and/or any other data or instructions.

A user profile 134 includes a plurality of biometric indicators 170, communication data 136 with interaction requests 144. A user profile 134 further includes one or more of user identifiers, username, physical address, email address, phone number, and any other data, such as documents, files, media items, etc. The plurality of user profiles may be stored by the processor 108 in the memory 114. The plurality of biometric indicators 170 are associated with the avatar 132 and are configured to register the avatar 132 associated with the user with an entity to access a plurality of physical locations in a real-world environment. In particular, the server 104 may determine one or more biometric indicators 156 upon receiving a request 144 from the avatar 132 when the avatar intends to access a plurality of physical locations in a real-world environment. The server 104 may authenticate the avatar 132 to allow the avatar to access the corresponding virtual operation areas 140 when the determined one or more biometric indicators 156 match the corresponding biometric indicators 170 from the user profile 134 stored in the memory 114. The plurality of biometric indicators is configured to provide multiple levels of authentication for the avatar 132 associated with the user in a real-world environment and an avatar 132 associated with the user to navigate in a virtual environment 130. The meta-profile 146 includes interaction data 148 and mapping data 147 configured to associate corresponding biometric indicators 170 to the user device 102 and the associated avatar 132. The information security software instructions 116 may comprise any suitable set of instructions, logic, rules, or code operable to execute the virtual operation security engine 110. In an example operation, the memory may store a virtual operation interaction model 150, a user interface application 152, and other program models which executed by the processor 108 to implement operational flows of the system of FIG. 1.

The virtual environment information 118 comprises user information 122 and environment information 124. The user information 122 generally comprises information that is associated with any user profiles associated with user accounts that can be used within a virtual environment 130. The environment information 124 includes data of virtual operation areas 140*a*-140*d* and corresponding virtual locations 142. For example, user information 122 may comprise user profile information, online account information, digital assets information, or any other suitable type of information that is associated with a user within a virtual environment 130. The environment information 124 generally comprises information about the appearance of a virtual environment 130. For example, the environment information 124 may comprise information associated with objects, landmarks, buildings, structures, avatars 132, virtual operation areas 140, or any other suitable type of element that is present within a virtual environment 130. In some embodiments, the environment information 124 may be used to create a representation of a virtual environment 130 for users. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. The server 104 may be configured to store one or more maps that translate or convert different types of interactions between the real world environment 120 and the virtual environment 130 and vice-versa.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Virtual Operation Security Engine

Virtual operation security engine 110 may include, but is not limited to, one or more separate and independent software and/or hardware components of a server 104. In some embodiment, the virtual operation security engine 110 may be implemented by the processor 108 by executing the information security software instructions 116 to create a virtual environment 130 and generate a plurality of virtual operation areas 140*a*-140*d* in the virtual environment 130. In some embodiments, the virtual operation security engine 110 may be implemented by the processor 108 by executing the user interface application 152 and the virtual operation interaction model 150 to process communication data 136 including a user request 144 from an avatar 132 associated with the user. The virtual operation security engine 110 may be implemented by the processor 108 by executing the user interface application 152 and the virtual operation interaction model 150 to dynamically grant the avatar 132 an authentication while the avatar 132 associated with the user navigates through and interacts with a plurality of virtual operation areas 140 associated with the entity through the server 104. The operation of the disclosed system 100 is described below.

Generating a Plurality of Virtual Operation Areas

The server 104 may generate a virtual environment 130 based on the virtual environment information 118 and the real-world information 120. FIG. 1 illustrates an example of a plurality of virtual operation areas 140 within a virtual environment 130. In some embodiments, the virtual environment 130 comprises a plurality of associated virtual operation areas 140 (e.g., 140*a*-140*d*). The virtual operation areas 140 may be configured to provide certain types of interactions associated with an entity and corresponding physical locations in a real-world environment. In one embodiment, the virtual operation areas 140 may be configured and executed by the processor 108 to provide one or more application services and interactions provided by the same or different entities or sub-entities at different physical locations in the real-world environment. The server 104 may be configured to store one or more maps executed by the processor 108 that translate or convert different types of interactions occurred in the virtual operation areas 140 between the real world and the virtual environment 130 and vice-versa.

Generating an Avatar for Entering Virtual Operation Areas in a Virtual Environment Within the virtual environment 130, an avatar 132 is generated by the processor 108 as a graphical representation of a user within the virtual environment 130. The avatar 132 is associated with the corresponding a meta-profile 146 associated with user profile 134. The avatar 132 includes a plurality of features and characteristics which are processed by the processor 108 to present the avatar 132 as the graphical representation of the user in the virtual environment 130.

For example, the server 104 may receive a signal indicating a physical location of the user device 102 and/or detect the user device 102 in the real-world environment. The server 104 may store the received signal in the memory 114. The server 104 may determine a virtual location of the avatar 132 associated with the user in the virtual environment 130 based on the physical location of the user device 102. The server 104 may obtain the environment information 124 and environment information 128 associated with the virtual location and physical location of the user device 102. The server 104 may generate and present an avatar 132 in the virtual environment 130 based on the user profile 134, the obtained environment information 124 and environment information 128. By using the user device 102, the avatar 132 can move or maneuver and interact with different entities, other avatars, and objects within the virtual environment 130. For example, the objects may be associated with fillable forms or documents, questions required for completing a task through the virtual operation areas 140, etc.

Authenticating an Avatar Associated with a User to Access a Virtual Environment Using Biometric Indicators This process may be implemented by the server 104 to extract a plurality of biometric indicators 170 derived from the user using facial recognition and fingerprint analysis. The plurality of biometric indicators includes one or more facial features 172, fingerprints 174, and tokens 176 to register the avatar 132 associated with the user with the entity for accessing a plurality of physical locations in the real-world environment. The one and more facial features 172 may represent three-dimensional and changes in appearance with lighting and facial expression obtained by a face scanner 162 associated with the user who attends to use the user device 102 to access the entity and conduct certain interactions in one or more physical locations in the real-world environment. The one and more fingerprints 174 may represent finger features such as finger skin texture obtained by a finger scan 160 associated with the user who attends to use the user device 102 to access the entity and conduct certain interactions in one or more physical locations in the real-world environment. Each token 176 may represent an access key or access credential for authorizing the user device 102 to access the entity and conduct certain interactions in one or more physical locations in the real-world environment. For example, the server 104 may generate the token 158 by implementing at least one operation associated with a block chain, a non-fungible token (NFT), or a secure application programming interface (API). Each token is represented by at least one of an alphanumeric value, a cryptocurrency, or an authentication string.

In some embodiments, the server 104 may embed the extracted plurality of biometric indicators 170 into an avatar 132 associated with the user. For example, the server 104 may generate a meta-profile 146 associated with the user profile 134. The meta-profile 146 includes the plurality of biometric indicators 170 to authorize the avatar 132 associated with the user to access the plurality of virtual operation areas 140. For example, the meta-profile 146 may include mapping data 147 which is configured to map each of the plurality of biometric indicators 170 associated with the user from the one or more corresponding physical locations to the corresponding virtual operation areas 140. The server 104 may associate each of the plurality of biometric indicators 170 to an avatar 132. Each of the plurality of biometric indicators 170 in the meta-profile 146 may be used when to allow the avatar 132 to access a particular virtual operation area 140.

In some embodiments, the server 104 receives a request 144 from the avatar 132 to access a virtual environment. In response to receiving the request 144 from the avatar 132 associated with the user for an interaction session in the virtual environment 130, the server 104 may determine a set of virtual operation areas 140 in the virtual environment. An interaction session may include one or more interactions between an avatar 132 associated with the user and an entity. The server 104 may use the processor 108 to determine the one or more biometric indicators 156 embedded into the avatar 132 in response to receiving the request 144 for access. Further, the server 104 may access the meta-profile 146 to identify and obtain the plurality of biometric indicators 170 associated with the avatar 132 associated with the user. The server 104 may compare the determined one or more biometric indicators 156 with the corresponding plurality of biometric indicators 170 from the user profile 134 stored in the memory 114. In response to determining a match between the determined one or more biometric indicators 156 and the corresponding plurality of biometric indicators 170 from the user profile 134 stored in the memory 114, the server 104 authenticates the avatar 132 and approves the request to allow the avatar 132 to access the virtual environment 130 to navigate through corresponding virtual operation areas 140. In response to determining a mismatch between the determined one or more biometric indicators 156 and the corresponding plurality of biometric indicators 170 from the user profile stored in the memory, the server 104 rejects the request 144 to allow the avatar 132 to access the virtual environment 130 to navigate through corresponding virtual operation areas 140. When the server 104 allows the avatar 132 to navigate through corresponding virtual operation areas 140, the avatar 132 may conduct certain authorized interactions provided by the entity associated with the virtual operation areas 140.

In this way, the server 104 uses the set of the plurality of biometric indicators associated with the registered avatar 132 associated with the user to dynamically authorize the avatar 132 seamlessly navigate through corresponding virtual operation areas 140 to conduct corresponding interactions with an entity and complete the user interaction session.

Example Operational Flow for Navigating Through Virtual Operation Areas

FIG. 3 provides an example operational flow of a method 300 of navigating through dynamic virtual operation areas and performing authentication for an avatar 132 associated with a user in the virtual environment using facial recognition and fingerprint. Modifications, additions, or omissions may be made to method 300. Method 300 may include more, fewer, or other operations. For example, operations may be performed by the server 104 in parallel or in any suitable order. One or more operations of method 300 may be implemented, at least in part, in the form of the information security software instructions 116 of FIG. 1, stored on non-transitory, tangible, machine-readable media (e.g., memory 114 of FIG. 1) that when executed by one or more processors (e.g., processor 108 of FIG. 1) may cause the one or more processors to perform operations 305-340.

The method 300 begins at operation 305 where the server 104 receives a user profile 134 that includes a plurality of biometric indicators derived from a user using facial recognition and fingerprint analysis. The plurality of biometric indicators may be the plurality of biometric indicators 170 stored in memory 114 which includes facial features 172, fingerprints 174, and tokens 176 derived from the user when the user accesses a virtual environment 130 comprising a plurality of virtual operation areas. Each virtual operation area 140 is configured to provide a corresponding interaction associated with an entity associated with one or more physical locations in the real-world environment.

At operation 310, the server 104 embeds the extracted plurality of biometric indicators 170 into an avatar 132 associated with the user. The server 104 may be configurated for establishing an interaction session between the avatar 132 and a virtual operation area 140 through the server 104 via the network 106.

At operation 315, the server 104 receives a request 144 from the avatar 132 to access a VR environment 130. In one embodiment, the server 104 may receive incoming communication data 136 from the avatar 132 through a user device 102. The communication data 136 may include a request 144 to establish an interaction session with the entity for completing a task. The task may be determined by the server 104 to perform the plurality of interactions in the corresponding virtual operation areas 140 based on the received communication data 136 and the user profile 134.

At operation 320, the server 104 determines one or more biometric indicators from the plurality of biometric indicators embedded into the avatar 132 in response to receiving the request 144 for access. In one embodiment, the server 104 may determine a one or more biometric indicators 156 which include facial features 405, fingerprints 410, and tokens 158 from the plurality of biometric indicators embedded into the avatar 132 in response to receiving the request 144 for access.

At operation 325, the server 104 compares the determined one or more biometric indicators 156 with the corresponding biometric indicators 170 from the user profile 134 stored in the memory 114.

At operation 330, the server 104 determines whether the determined one or more biometric indicators 156 match the corresponding biometric indicators 170 from the user profile 134 stored in the memory 114.

At operation 335, the server 104 authenticates the avatar 132 and approves the request 114 to allow the avatar 132 to access the virtual environment 130.

At operation 340, the server 104 rejects the request 144 to allow the avatar 132 to access the virtual environment 130.

In some embodiment, the server 104 identifies the set of the virtual operation areas 140 based on the communication data 136 received from the user device 102. The communication data 136 is indicative of a task to be completed during the interaction session. In one embodiment, the interaction session may include corresponding interactions with certain levels of dependencies between each other. The server 104 may instruct the avatar 132 to access the set of the virtual operation areas 140 in a particular order based on the dependencies of respective interactions of the interaction session in the corresponding virtual operation areas 140. For example, one interaction to be performed may depend on whether another interaction is complete based on the task. In one embodiment, the server 104 may allow the avatar 132 to choose to access the set of the virtual operation areas 140 respectively to perform the corresponding interactions for complete the interaction session. In this case, one interaction may not depend on whether another interaction is complete.

In some embodiments, software instructions 116 associated with the operational flows and other described processes may be deployed into a practical application executed by the server 104 to implement any operations in the virtual operation areas 140. The practical application may be implemented by the processor 108 to receive and process communication data 136 from the avatar 132 associated with the user, and detect the avatar 132 entering a virtual operation areas in a virtual environment 130. The practical application may be implemented by the processor 108 to compare the determined one or more biometric indicators 156 to the corresponding plurality of biometric indicators 170 associated with the avatar 132 associated with the user to register the avatar 132 associated with the user. The processor 108 may determine a match between the determined one or more biometric indicators 156 and the corresponding plurality of biometric indicators 170 to authorize the avatar 132 to seamlessly navigate and perform interactions in the corresponding virtual operation areas 140 in the virtual environment 130. The avatar 132 may seamlessly navigate through the virtual operation areas 140 to complete a task predefined by the server 104 based on the communication data 136 via the network in real time.

Facial Features and Fingerprints

Figure 4A:
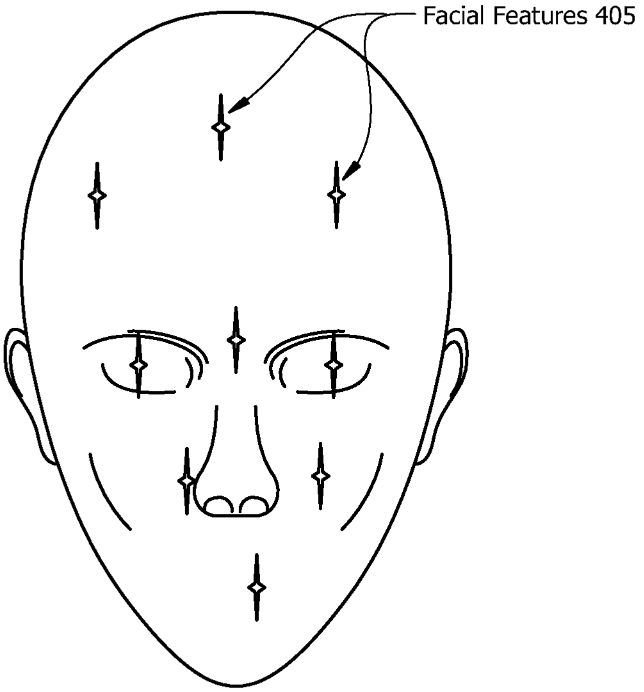
FIGS. 4A and 4B illustrate examples of biometric indicators associated with the avatar.
Figure 4B:
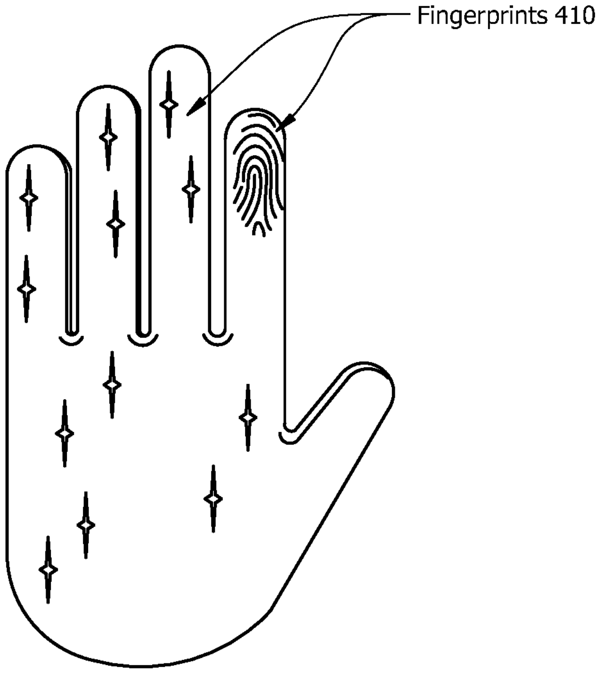

FIGS. 4A and 4B illustrate examples of biometric indicators associated with a user. The biometric indicators include facial features 405 and fingerprints 410 embedded in an avatar associated with a user. The avatar embedded with biometric indicators may be distinguished from other similar looking avatars that are not embedded with the biometric indicators of the user. When the avatar embedded with the biometric indicators of the user seeks to gain access to particular areas within the virtual environment, one or more biometrics from that avatar may be extracted from the avatar when the avatar is going to be authenticated by comparing against biometric markers that are stored in a user profile for the user. FIG. 4A shows the server 104 may determine facial features 405 from the user using facial recognition. The facial features may be associated with facial symmetry in a face image derived using a face recognition system (e.g., a face scanner 162) based on the idea that each user has a particular face structure. The server 104 may apply a computerized face-matching algorithm to solve the face recognition problem. For example, a recognition process is applied to form an eigenface using the determined facial features 405 in a given face image to calculate an Euclidian distance between the eigenface based on facial features 405 from the first set of biometric indicators 156 and a previously stored eigenface based on facial features 172 from the second set of biometric indicators 170. The eigenface with the smallest Euclidian distance is the one the person resembles the most.

FIG. 4B shows the server 104 may determine fingerprints 410 from the user using facial recognition. The fingerprints 410 may be associated with finger features such as skin texture derived using a fingerprint analysis system (e.g., a finger scanner 160) based on the idea that each user has particular finger features. The server 104 may apply a fingerprint analysis based on basic fingerprint, patterns (arch, whorl, and loop) to determine a graphical match between fingerprints 410 from the first set of biometric indicators 156 and previously stored fingerprints 174 from the second set of biometric indicators 170. The fingerprints with the best graphical match is the one the person resembles the most.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:

a memory operable to store:

a user profile comprising a plurality of biometric indicators derived from a user using facial recognition and fingerprint analysis, wherein each biometric indicator of the plurality of biometric indicators provides the user access to a corresponding physical location associated with an entity in a real-world environment; and a processor operably coupled to the memory, the processor configured to:

extract the plurality of biometric indicators from the user profile;

embed the extracted plurality of biometric indicators into an avatar associated with the user;

generate a meta-profile associated with the user profile, wherein:

the meta-profile includes mapping data configured to map each biometric indicator of the plurality of biometric indicators from one or more corresponding physical locations associated with the entity in the real-world environment to a corresponding virtual operation area within a virtual reality (VR) environment;

each biometric indicator mapped to the corresponding virtual operation area within the VR environment provides the user access to the corresponding virtual operation area;

receive a request from the avatar to access a particular virtual operation area in the VR environment, wherein the request indicates that the avatar is entering the particular virtual operation area in the VR environment;

determine from the meta-profile a particular biometric indicator of the user that is mapped to the particular virtual operation area;

in response to receiving the request to access the particular virtual operation area, determine, from the plurality of biometric indicators embedded into the avatar, a corresponding biometric indicator that corresponds to the particular biometric indicator that is mapped to the particular virtual operation area;

compare the determined particular biometric indicator with the corresponding biometric indicator from the user profile stored in the memory;

determine a match between the determined particular biometric indicator and the corresponding biometric indicator from the user profile stored in the memory;

in response to determining the match, authenticate the avatar;

and in response to authenticating the avatar, approve the request to allow the avatar to access the particular virtual operation area in the VR environment, wherein, upon authentication, the avatar seamlessly navigates to the particular virtual operation area to complete an interaction session within the VR environment, the interaction session comprising one or more interactions between the avatar and the entity associated with the corresponding physical location in the real-world environment.

2. The system of claim 1, wherein the processor is further configured to:

receive a second request from the avatar to access the VR environment;

determine additional biometric indicators from the plurality of biometric indicators embedded into the avatar in response to receiving the second request for access;

compare the determined additional biometric indicators with the corresponding additional biometric indicators from the user profile stored in the memory;

determine a mismatch between the determined additional biometric indicators and the corresponding additional biometric indicators from the user profile stored in the memory;

in response to determining a mismatch, reject the second request to allow the avatar to access the VR environment.

3. The system of claim 1, wherein the VR environment includes a plurality of virtual operation areas configured to provide a corresponding interaction associated with an entity associated with one or more physical locations in a real-world environment.

4. The system of claim 1, wherein the processor is configured to perform periodic and event triggered authentication of the avatar associated with the user, further comprising:

determining one or more biometric indicators from the plurality of biometric indicators embedded into the avatar in response to receiving the request for access;

comparing the determined one or more biometric indicators with the corresponding biometric indicators from the user profile stored in the memory;

determining a match between the determined one or more biometric indicators and the corresponding biometric indicators from the user profile stored in the memory; and in response to determining the match, authenticating the avatar.

5. The system of claim 4, wherein the authentication of the avatar occurs in conjunction with predetermined time periods.

6. The system of claim 4, wherein the authentication of the avatar occurs upon screen refresh.

7. The system of claim 1, wherein the authentication of the avatar is triggered by the avatar entering a new operation area within the VR environment.

8. The system of claim 1, wherein the authentication of the avatar is triggered by the avatar attempting to perform a transaction.

9. The system of claim 1, wherein the plurality of biometric indicators includes a token, facial features, and fingerprints.

10. A method comprising:

extracting a plurality of biometric indicators from a user profile stored in a memory of a server, wherein the plurality of biometric indicators is derived from a user using facial recognition and fingerprint analysis, wherein each biometric indicator of the plurality of biometric indicators provides the user access to a corresponding physical location associated with an entity in a real-world environment;

embedding the extracted plurality of biometric indicators into an avatar associated with the user;

generating a meta-profile associated with the user profile, wherein:

the meta-profile includes mapping data configured to map each biometric indicator of the plurality of biometric indicators from one or more corresponding physical locations associated with the entity in the real-world environment to a corresponding virtual operation area within a virtual reality (VR) environment; and each biometric indicator mapped to the corresponding virtual operation area within the VR environment provides the user access to the corresponding virtual operation area;

receiving a request from the avatar to access a particular virtual operation area in the VR environment, wherein the request indicates that the avatar is entering the particular virtual operation area in the VR environment;

determining from the meta-profile a particular biometric indicator of the user that is mapped to the particular virtual operation area;

in response to receiving the request to access the particular virtual operation area, determining, from the plurality of biometric indicators embedded into the avatar, a corresponding biometric indicator that corresponds to the particular biometric indicator that is mapped to the particular virtual operation area;

comparing the determined particular biometric indicator with the corresponding biometric indicator from the user profile stored in the memory;

determining a match between the determined particular biometric indicator and the corresponding biometric indicator from the user profile stored in the memory;

in response to determining the match, authenticating the avatar;

and in response to authenticating the avatar, approving the request to allow the avatar to access the particular virtual operation area in the VR environment, wherein, upon authentication, the avatar seamlessly navigates to the particular virtual operation area to complete an interaction session within the VR environment, the interaction session comprising one or more interactions between the avatar and the entity associated with the corresponding physical location in the real-world environment.

11. The method of claim 10, further comprising:

receiving a second request from the avatar to access the VR environment;

determining additional biometric indicators from the plurality of biometric indicators embedded into the avatar in response to receiving the second request for access;

comparing the determined additional biometric indicators with the corresponding additional biometric indicators from the user profile stored in the memory;

determining a mismatch between the determined additional biometric indicators and the corresponding additional biometric indicators from the user profile stored in the memory;

in response to determining a mismatch, rejecting the second request to allow the avatar to access the VR environment.

12. The method of claim 10, wherein the VR environment includes a plurality of virtual operation areas configured to provide a corresponding interaction associated with an entity associated with one or more physical locations in a real-world environment.

13. The method of claim 10, further comprising:

performing periodic and event triggered authentication of the avatar associated with the user, further comprising:

determining one or more biometric indicators from the plurality of biometric indicators embedded into the avatar in response to receiving the request for access;

comparing the determined one or more biometric indicators with the corresponding biometric indicators from the user profile stored in the memory;

determining a match between the determined one or more biometric indicators and the corresponding biometric indicators from the user profile stored in the memory; and in response to determining the match, authenticating the avatar.

14. The method of claim 13, wherein the authentication of the avatar occurs in conjunction with predetermined time periods.

15. The method of claim 13, wherein the authentication of the avatar occurs upon screen refresh.

16. The method of claim 10, wherein the authentication of the avatar is triggered by the avatar entering a new operation area within the VR environment.

17. The method of claim 10, wherein the authentication of the avatar is triggered by the avatar attempting to perform a transaction.

18. The method of claim 10, wherein the plurality of biometric indicators includes a token, facial features, and fingerprints.

19. A non-transitory computer-readable medium that stores instructions that when executed by a processor, causes the processor to:

extract a plurality of biometric indicators from a user profile stored in a memory of a server, wherein the plurality of biometric indicators is derived from a user using facial recognition and fingerprint analysis, wherein each biometric indicator of the plurality of biometric indicators provides the user access to a corresponding physical location associated with an entity in a real-world environment;

embed the extracted plurality of biometric indicators into an avatar associated with the user;

generate a meta-profile associated with the user profile, wherein:

the meta-profile includes mapping data configured to map each biometric indicator of the plurality of biometric indicators from one or more corresponding physical locations associated with the entity in the real-world environment to a corresponding virtual operation area within a virtual reality (VR) environment; and each biometric indicator mapped to the corresponding virtual operation area within the VR environment provides the user access to the corresponding virtual operation area;

receive a request from the avatar to access a particular virtual operation area in the VR environment, wherein the request indicates that the avatar is entering the particular virtual operation area in the VR environment;

determine from the meta-profile a particular biometric indicator of the user that is mapped to the particular virtual operation area;

in response to receiving the request to access the particular virtual operation area, determine, from the plurality of biometric indicators embedded into the avatar, a corresponding biometric indicator that corresponds to the particular biometric indicator that is mapped to the particular virtual operation area;

compare the determined particular biometric indicator with the corresponding biometric indicator from the user profile stored in the memory;

determine a match between the determined particular biometric indicator and the corresponding biometric indicator from the user profile stored in the memory;

in response to determining the match, authenticate the avatar;

and in response to authenticating the avatar, approve the request to allow the avatar to access the particular virtual operation area in the VR environment, wherein, upon authentication, the avatar seamlessly navigates to the particular virtual operation area to complete an interaction session within the VR environment, the interaction session comprising one or more interactions between the avatar and the entity associated with the corresponding physical location in the real-world environment.

20. The non-transitory computer-readable medium of claim 19, wherein the instructions when executed by the processor further cause the processor to:

receive a second request from the avatar to access the VR environment;

determine additional biometric indicators from the plurality of biometric indicators embedded into the avatar in response to receiving the second request for access;

compare the determined additional biometric indicators with the corresponding additional biometric indicators from the user profile stored in the memory;

determine a mismatch between the determined additional biometric indicators and the corresponding additional biometric indicators from the user profile stored in the memory;

in response to determining a mismatch, reject the second request to allow the avatar to access the VR environment.

* * * * *